April 6, 1954

J. W. RYDEN 2,674,082

WINDROWING HARVESTER

Original Filed March 17, 1950

INVENTOR
JAMES W. RYDEN

BY
McMorrow, Berman & Davidson
ATTORNEYS

April 6, 1954　　　　J. W. RYDEN　　　　2,674,082
WINDROWING HARVESTER
Original Filed March 17, 1950　　　　6 Sheets-Sheet 3

INVENTOR
JAMES W. RYDEN
BY
McMorrow, Berman + Davidson
ATTORNEYS

April 6, 1954

J. W. RYDEN

2,674,082

WINDROWING HARVESTER

Original Filed March 17, 1950

INVENTOR
JAMES W. RYDEN

BY
McMorrow, Berman + Davidson
ATTORNEYS

April 6, 1954   J. W. RYDEN   2,674,082
WINDROWING HARVESTER Original Filed March 17, 1950   6 Sheets-Sheet 5

INVENTOR
JAMES W. RYDEN

BY
McMorrow, Berman & Davidson
ATTORNEYS

INVENTOR
JAMES W. RYDEN

Patented Apr. 6, 1954

2,674,082

UNITED STATES PATENT OFFICE 2,674,082

WINDROWING HARVESTER

James W. Ryden, Hallock, Minn.

Continuation of application Serial No. 150,229, March 17, 1950. This application July 25, 1952, Serial No. 300,848

3 Claims. (Cl. 56—192)

This application is a continuation of application Serial No. 150,229, filed March 17, 1950, now abandoned, and has to do with an invention relating to harvesters and more particularly to a self propelled harvester for cutting plant growth, such as standing grain, and piling the same in windrows from which it can be picked up by another machine such as a threshing machine or baler.

It is among the objects of the invention to provide an improved windrowing harvester that will cut a wide swath of standing grain, or similar material, and pile all of the material cut in a single swath into a single windrow which the machine straddles as it progresses and which windrow is spaced from the wheel tracks of the machine so that the cut material will be supported on the stubble left standing and out of contact with the ground, which harvester has a single engine which propels it and operates the cutting mechanism, which includes a grain receiving table which supports the cutter bar and a reel for moving cut material onto the table, and manually controlled, power operated means for varying the level of the cutter bar and reel above the ground to accommodate the machine to plant growth of different heights and to different ground conditions, which includes means for adjustably changing the position of the grain table and reel relative to the ground and to each other, and which is simple and durable in construction, economical to manufacture, easy to operate and not subject to clogging or other malfunctioning in use.

Other objects and advantages will become apparent from a consideration of the following description and the appended claims in conjunction with the accompanying drawings wherein:

With continued reference to the drawings the machine has an elongated dead axle 10 which is preferably formed of a length of suitable steel tubing. Cranks or brackets 11 and 12 are secured to the opposite ends of the axle 10 and main drive wheels 13 and 14 are journaled on the cranks 11 and 12 respectively below the axle 10 so that the axle is supported at an elevation above the centers of the main wheels. The axle 10 has a length sufficient to give the machine a wide wheel base so that there will be no tendency for the machine to upset, the machine will not be prone to dig into the ground at any part thereof due to unevenness of the area over which the machine is propelled and there will be ample room between the main wheels of the machine for the windrow so that the grain will not lie in the wheel tracks.

A horizontally disposed main frame is positioned between the wheels 13 and 14 and has the forward end supported by the wheels. Specifically, the frame is of generally triangular shape and has the front end mounted on the axle 10, the frame comprising two side members 15 and 16 each connected at one end to the axle 10 near a corresponding end of the axle. These side members converge rearwardly from the axle 10 with the member 16 making a sharper angle with the axle than the member 15, the frame terminating in a blunt rear apex where the rear ends of the side members 15 and 16 are connected by a short cross member 17. The ends of the members 15 and 16 at the front end of the frame are disposed substantially perpendicular to the axle 10 and substantially parallel to each other.

Figure 2:
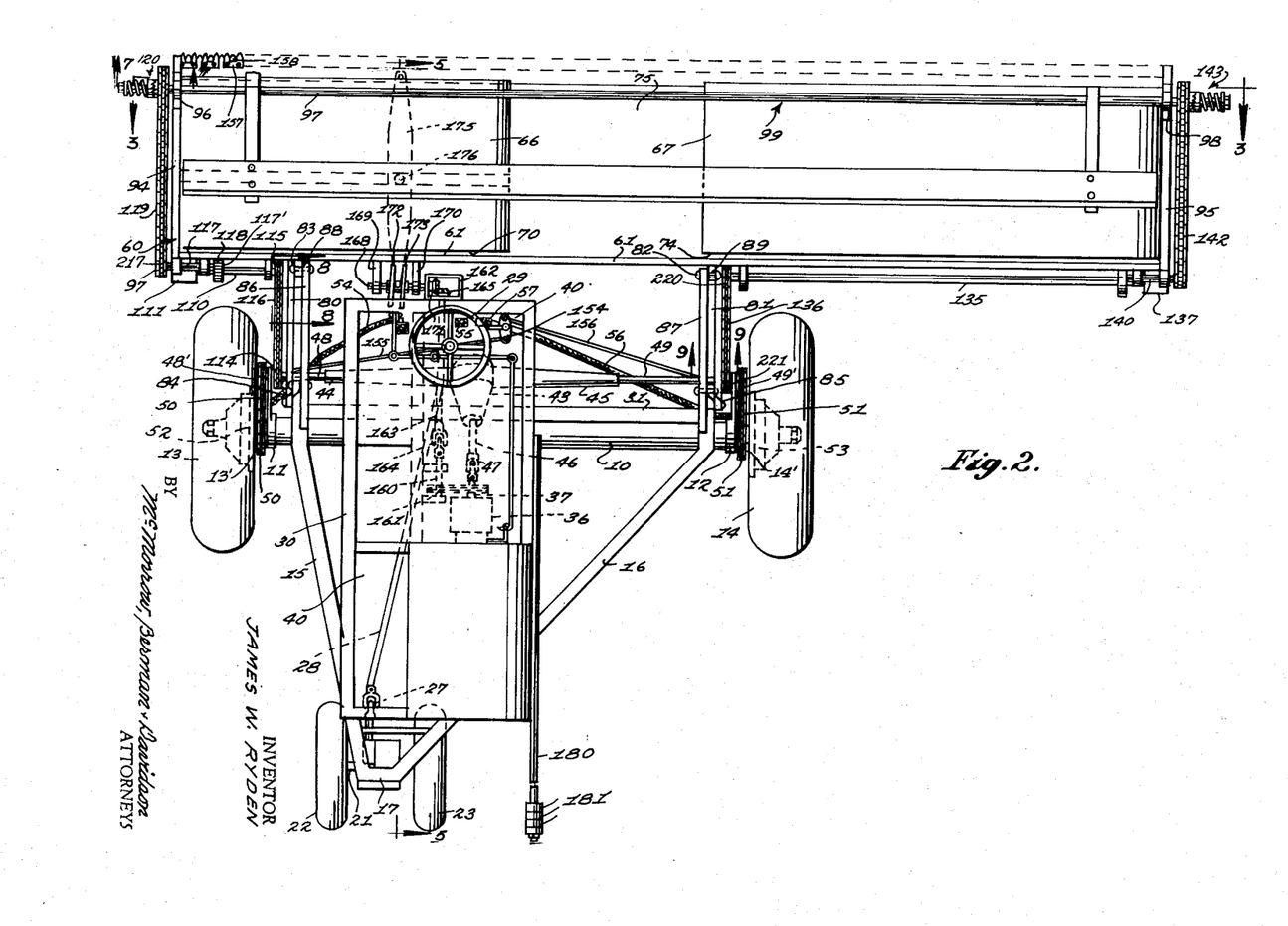
Figure 2 is a top plan view of the machine illustrated in Figure 1.
Figure 3:
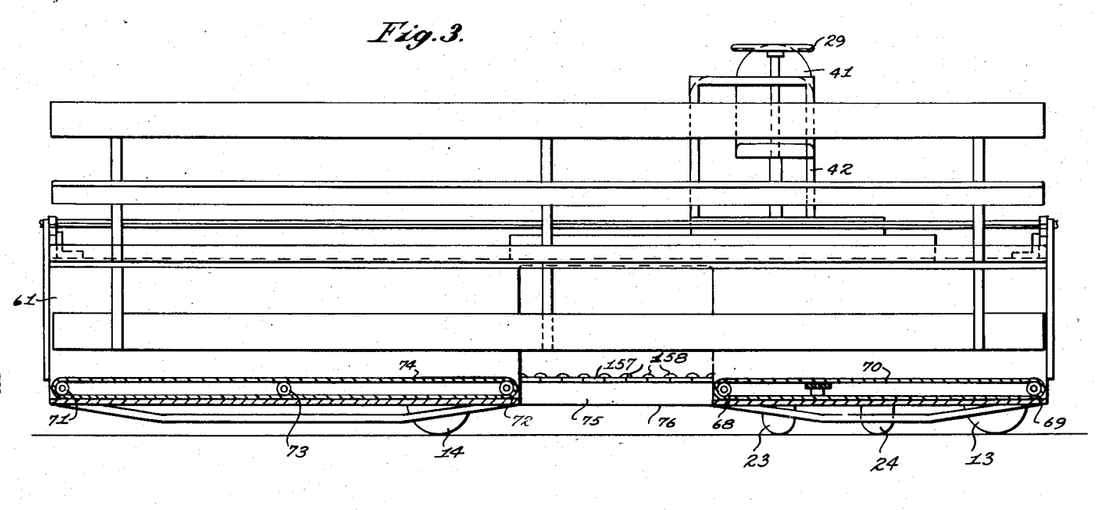
Figure 3 is a cross sectional view on the line 3—3 of Figure 2.
Figure 4:
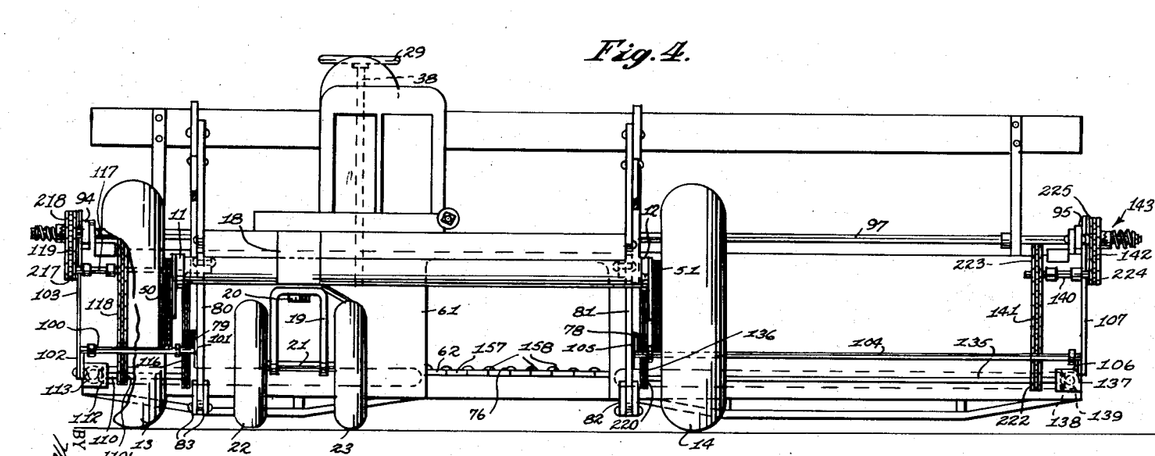
Figure 4 is a rear end elevational view, with parts broken away, of the machine.

A steerable wheel assembly 18 supports the rear end of the horizontally disposed frame, the assembly being disposed between the drive wheels 13 and 14 and nearer to the wheel 13 than to the wheel 14 and thereby form a space between the wheel assembly 18 and the other wheel 14 of the pair of drive wheels 13 and 14 for the passage of the cut grain therethrough without being disturbed, as shown in Figure 2. Specifically, the assembly 18 is secured to the under side of the frame at the rear end of the latter and a yoke 19 of inverted U shape has its intermediate position pivotally connected to the structure 18 by a pivot pin 20 and extends downwardly from the under side of the fifth wheel structure. A rear axle 21 is secured to the lower end of the yoke 19 and a pair of rear wheels 22 and 23 are mounted on the axle 21 at respectively opposite sides of the yoke 19.

A worm wheel is secured on the pin 20 above the bottom wall of the structure 18 and is enclosed in a gear housing 24. A worm enclosed in a portion 25 of the housing 24 meshes with the worm wheel and a shaft 26 projects forwardly from the worm and is connected by a universal joint 27 with a steering shaft 28 which extends forwardly to an operative connection with a manually operated steering wheel 29 as will be later described in detail.

An auxiliary frame 30 of elongated rectangular shape is mounted on the main frame and rests at its rear end on the side members 15 and 16 near the rear cross member 17 of the main frame. Near its front end the auxiliary frame 30 rests on the front cross member 31 of the main frame which is above and substantially parallel to the axle 10 and the auxiliary frame extends forwardly of the axle 10.

An internal combustion engine 32 is mounted on the auxiliary frame 30 at the rear end and at one side of this auxiliary frame and the engine is enclosed in a suitable hood 33 at the rear end of which is provided an engine cooling radiator 34. At its front end the engine is provided with a clutch assembly 35 and with a reduction gear unit 36 and the engine drive shaft 37 projects forwardly from the reduction gear unit 36 for connection to the main wheels and cutting mechanism of the machine by connecting means later to be described in detail.

A steering column 38 extends vertically through the auxiliary frame 30 near the front end of this auxiliary frame and the steering wheel 29 is secured to the upper end of this steering column. At its lower end the steering column is connected to the front end of the steering shaft 28 by a beveled gear train 39 so that the rear wheels 22 and 23 can be manually steered from the steering wheel 29.

A platform 40 is provided on the portion of the auxiliary frame not occupied by the engine 32 and its hood 33 and an operator's seat 41 is mounted on this platform adjacent the steering end of the auxiliary frame 30 around the steering column 38 and the front portion of the seat 41.

A differential unit 43 is positioned above and somewhat forwardly of the axle 10 and tubular axle housings 44 and 45 project in opposite directions from this differential unit and are disposed substantially parallel to the axle 10. A pinion gear shaft 46 projects rearwardly from the differential unit 43 and is connected by a universal joint 47 to the engine drive shaft 37 and axle shafts 48 and 49 are journaled in the tubular housings 44 and 45 respectively.

The axle shaft 48 is connected at one end to the mechanism of the differential unit 43 and is journaled near its opposite end in a portion of the bracket 11 while the axle shaft 49 is connected at one end to the differential mechanism and is journaled near its opposite end in a portion of the bracket 12. A chain sprocket 48′ is secured on the axle shaft 48 at the outer side of the bracket 11 and a complementary chain sprocket 13′ is secured to the inner side of the main wheel 13 and these chain sprockets are drivingly connected by a link chain 50. A chain sprocket 49′ is secured on the end of the axle shaft 49 at the outer side of the bracket 12, a complementary chain sprocket 14′ is secured to the inner side of the main wheel 14 and a link chain 51 connects these chain sprockets.

With this arrangement the main wheels 13 and 14 are driven from the engine 32 through the differential unit 43. The main wheel 13 is provided with a brake mechanism 52 and the main wheel 14 is provided with a brake mechanism 53. The brake mechanism 52 is connected by suitable means, such as the fluid line 54 with a brake pedal 55 and the brake 53 is connected by a similar fluid line 56 to a brake pedal 57, the pedals 55 and 57 being independently connected to the brakes 52 and 53 so that either one of the main drive wheels can be retarded by the corresponding brake and the drive continued by the other wheel through the differential mechanism.

With this arrangement the operator steers the machine by steering the rear wheel truck assembly by means of the steering wheel 29 and also by differentially braking the main wheels 13 and 14.

A grain table and backboard assembly 60 is disposed forwardly of the front end of the main frame, such assembly including a horizontally disposed table 62 which is arranged transversely of and below the main frame and forwardly of the drive wheels 13 and 14, the table being of a length such that slightly more than one-half lies on the side of the other wheel 14 of the drive wheels adjacent said one wheel 13 with the remainder lying beyond the side of the wheel 14 remote from the wheel 13, as clearly shown in Figure 2. An upstanding backboard 61 extends along the side edge of the table 62 adjacent the main frame. Arranged along the side edge of the table 62 remote from the main frame is a cutting means for severing the standing grain stalks. The cutting means includes a continuous bar 63 and the cutter bar assembly 64 is mounted on the upper edge of the bar 63 and projects forwardly therefrom. Suitable grain or guide boards, as indicated at 65, are mounted one at each end of the bar 63 for separating the grain along the edges of the swath cut by the machine.

A pair of endless conveyers 66 and 67, arranged in confronting end to end spaced relation are superimposed longitudinally of and upon the table 62 forwardly of the backboard 61 and each of said conveyers is mounted for rotation about horizontal axes. The conveyer 66 comprises two horizontal axes or rollers 68 and 69 which extend transversely of the grain table frame and are journaled at their opposite ends in the frame. The inner roller 68 is located to the left of the mid-length location of the grain table and the outer roller 69 is located at the left-hand end of the table frame, as viewed in Figure 2. A belt 70 of a suitable flexible material, such as canvas, is trained around the rollers 68 and 69 and together with these rollers constitutes the conveyer 66.

The conveyer 67 comprises two horizontal axes or end rollers 71 and 72 and an intermediate roller 73. The inner end roller 72 is positioned substantially at the mid-length location of the grain table frame and the outer end roller 71 is positioned at the right-hand end of the frame, as viewed in Figure 2, while the intermediate roller 73 is positioned substantially midway between the end rollers 71 and 72. These rollers 71, 72 and 73 extend transversely of the grain table 62 and are journaled at their opposite ends in the table and an endless belt 74 is trained around the end rollers 71 and 72. The roller 68 is spaced from the roller 72 to provide between the adjacent ends of the conveyer assemblies an opening 75 through which the cut material is dumped onto the ground to form a windrow. The spacing between the rollers 68 and 72 and providing the opening 75 is located between the steerable wheel assembly 18 and the drive wheel 14. The top flights of the two belts 70 and 74 move toward this opening so that all of the material cut in a single swath is moved to the opening 75 and piled in a single windrow one side of which is just inside the main drive wheel 14 and the other side of which is just inside the adjacent rear wheel 23, the space between the wheel 14 and the wheel 23 being sufficient so that the grain dumped through the opening 75 does not fall into the wheel tracks.

The portion of the backboard 61 intermediate the wheel assembly 18 and the wheel 14 is provided with a rectangular opening 76 which registers with the opening 75 between the conveyers 66 and 67 and the space between the wheel assembly 18 and the other wheel 14 of the pair of drive wheels 13 and 14 so that the material windrowed by the machine passes through the opening 76 in the backboard and is not dragged by the backboard.

A first main link 80 is pivotally connected at its rear end to the front end of the side member 15 of the main frame and a second main link 81 is pivotally connected at its rear end to the front end of the side member 16 of the main frame. These links 80 and 81 incline downwardly and forwardly from the front end of the main frame, as is clearly illustrated in Figure 1, and are pivotally connected at their forward ends adjacent the lower edge of the backboard component 61 of this assembly. The backboard is provided with two pairs of rearwardly extending, apertured lugs, as indicated at 82 and 83 and the links 80 and 81 are provided with apertures near their front ends and are pivotally connected to the lug formations 82 and 83 by pivot pins extending through registering apertures in the links and the lugs. These main links 80 and 81 constitute the main support of the assembly 60 on the machine frame. A braced strut assembly 84 projects upwardly from the front end of the main frame side member 15 and a similar braced strut assembly 85 projects upwardly from the front end of the main frame side member 16. A first auxiliary link 86 is pivotally connected at its forward end to the backboard 61 near the top edge of the latter and is pivotally connected at its rearward end to the upper end of the strut assembly 84. A second auxiliary link 87 is pivotally connected at its forward end to the backboard 61 near the upper edge of the latter and is pivotally connected near its rearward end to the upper end of the strut assembly 85. The secondary links may be connected to the backboard by suitable means such as the lugs 88 and 89 secured to the rear side of the backboard and pivot pins extending through registering apertures in these lugs and the corresponding secondary links. Near its rearward end each of the secondary or auxiliary links 86 and 87 is provided with a series of apertures spaced apart longitudinally of the links, as indicated at 90 and 91 in Figures 1 and 5, and these secondary links are adjustably connected to the upper ends of the corresponding strut assemblies 84 and 85 by suitable bolts or pins extending through apertures in the upper ends of the strut assemblies and selected apertures of the series of apertures in the auxiliary links. The geometry of the structure is such that each auxiliary link is disposed above and substantially parallel to a corresponding main link providing a quadrilateral arrangement which maintains the backboard 61 substantially vertical and the grain table 62 substantially horizontal as the grain table and backboard assembly is raised and lowered relative to the machine frame.

Figure 1:
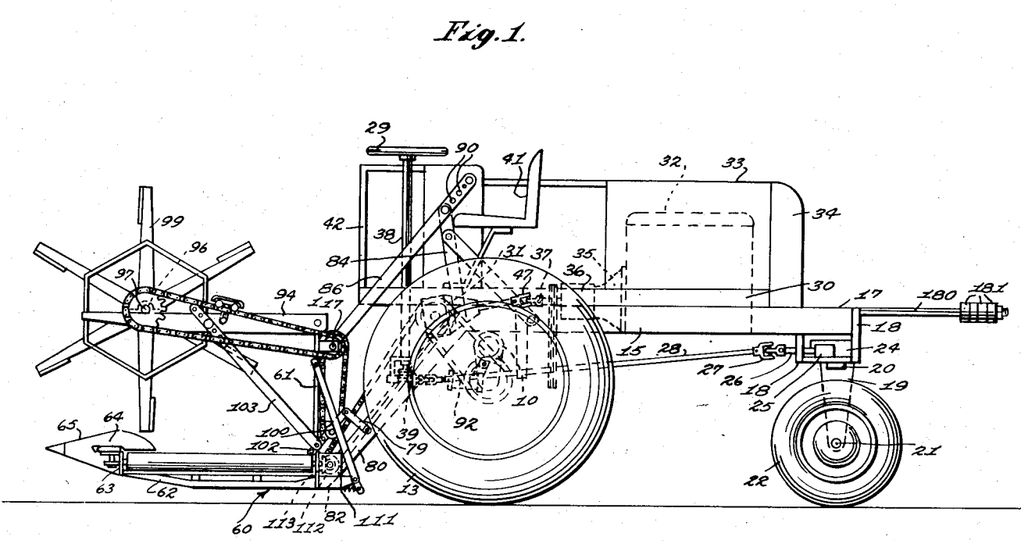
Figure 1 is a side elevational view of a harvesting machine illustrative of the invention.
Figure 5:
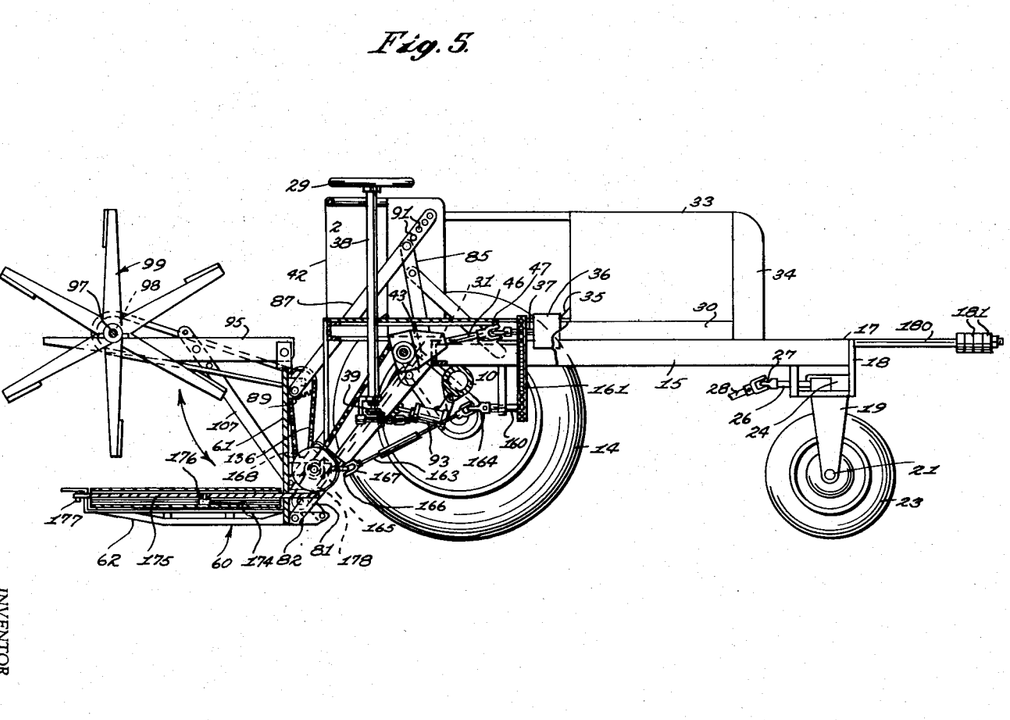
Figure 5 is a cross sectional view on the line 5—5 of Figure 2.
Figure 6:
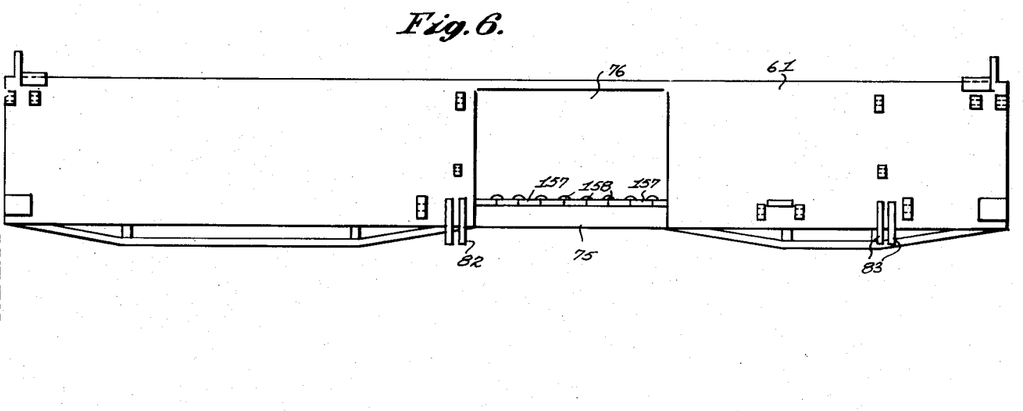
Figure 6 is a rear elevational view of the grain table and backboard assembly of the machine.

In order to raise and lower the assembly 60 two expansible chamber hydraulic devices 92 and 93 are connected between the axle 10 and the main links 80 and 81 respectively, as is particularly illustrated in Figures 1 and 5 for swinging the main links about the pivotal connections between the rear ends of these links and the axle brackets 11 and 12.

These hydraulic devices may be operated from an engine driven hydraulic pump and manually controlled by a suitable manually operated valve, not illustrated.

A horizontally disposed reel 99 is positioned longitudinally of and above the table 62 and forwardly of the backboard 61 and is supported on the backboard for rotation about a horizontal axis. Specifically, there are two supporting arms 94 and 95 which are pivotally connected at their rear ends to the backboard 61 at the respectively opposite ends and adjacent the top edge of the latter and extend forwardly above the grain table 62. The arm 94 carries, near its outer end, a bearing 96 in which the reel shaft 97 is journaled near one end of the latter and the arm 95 carries, near its outer end, a similar bearing 98 in which the reel shaft is journaled near its opposite end. The reel 99 is mounted on the horizontal axis or reel shaft 97 and rotates therewith.

A shaft 100 is journaled on the rear side of the backboard 61 by suitable bearing brackets and extends from the location of the main link 80 to the adjacent end of the assembly 60. A lever arm 101 is secured at one end to the inner end of the shaft 100 and is pivotally connected at its opposite end to the link 80 intermediate the length of the latter by a link 79. A lever arm 102 is secured at one end to the outer end of the shaft 100 and extends from the shaft in a direction opposite the lever arm 101. A brace link 103 is pivotally connected at one end to the lever arm 102 and is pivotally connected at its opposite end to the reel supporting arm 94 at a location intermediate the length of the reel supporting arm. The arm 102 is provided with a series of apertures spaced apart longitudinally of the arm and the brace 103 is provided at its end connected to the reel supporting arm 94 with a series of apertures spaced apart longitudinally of the brace so that the brace can be adjustably connected between the arm 102 and the reel supporting arm 94 to support the reel in a desired position above the grain table 62.

A second shaft 104 is journaled on the rear side of the backboard 61 by suitable bearing means and extends from the main link 81 to the right-hand end of the assembly 60. A lever arm 105 is secured at one end to the inner end of the shaft 104 and is pivotally connected at its opposite end to the link 81 intermediate the length of the latter by a link 78. A lever arm 106 is secured at one end to the outer end of the shaft 104 and extends in a direction opposite the lever arm 105. A brace link 107 is pivotally connected at one end to the lever arm 106 at the end of the latter remote from the shaft 104 and this brace link is pivotally connected at its opposite end to the reel supporting arm 95 intermediate the length of the latter. The link 107 is adjustably connectible to the lever arm 106 and the reel supporting arm 95 by a series of spaced apart apertures in the brace link and in the lever arm, as described above in connection with the brace link 103 to support the corresponding end of the reel at a desired elevation above the grain table of the machine.

With the above described linkage, when the grain table and backboard assembly is raised by the hydraulic devices 92 and 93 the reel will be simultaneously raised but to an extent somewhat greater than that to which the grain table is raised in order to automatically condition the machine to different heights of standing grain.

Means are provided for driving the conveyers and the reel from the drive shafts 48 and 49 and may conveniently comprise the following mechanism:

A shaft 110 is journaled on the rear side of the backboard 61 near the lower edge of the backboard and at the left-hand end as viewed in Figure 2. One end of this shaft is received in a gear box 111 and the shaft of the end roller 69 of the conveyer unit 66 extends into this gear box. The shaft 110 is drivingly connected to the roller 69 by a pair of beveled gears of which the gear 112 is secured on the end of the shaft 110 and the gear 113 is secured on the adjacent end of the roller shaft. A sprocket 114 is secured on the axle shaft 48 and a complementary sprocket 115 is secured on the shaft 110 and a link chain 116 drivingly connects the sprockets 114 and 115 so that the shaft 110 is driven from the axle shaft 48 and in turn drives the outer end roller of the conveyer 66.

A stub shaft 117 is journaled on the back side of the backboard 61 near the upper edge of the latter and above the shaft 110. Complementary sprockets 110' and 117' on the shafts 110 and 117 are drivingly connected by a chain 118 so that the shaft 117 is driven by the shaft 110. A sprocket 217 is secured on the outer end of the shaft 117 and a complementary sprocket 218 is journaled on the reel shaft 97 at the outer side of the reel supporting arm 94 and a chain 119 drivingly connects these sprockets so that the reel shaft sprocket is driven from the stub shaft 117. A one way drive is provided between the sprocket journaled on the reel shaft and the reel shaft by a clutch device generally indicated at 120 in Figure 2 and illustrated in detail in Figure 7.

Figures 7, 8, 9, 10:
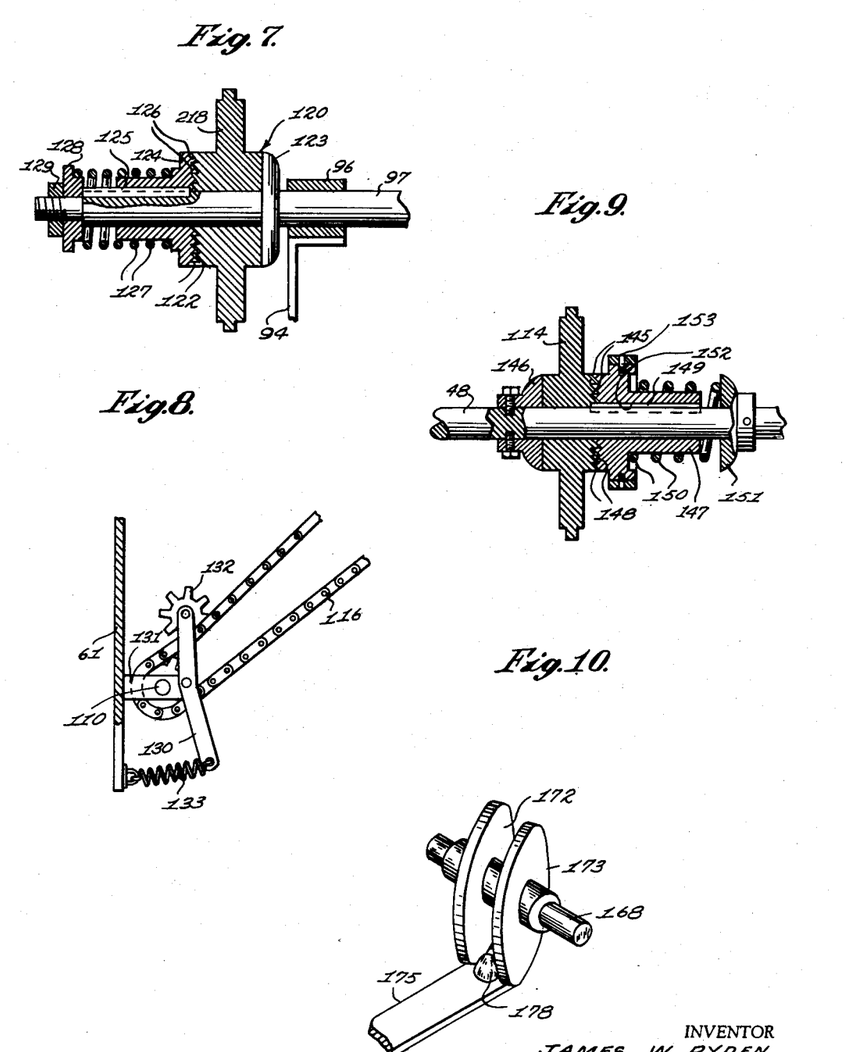
Figure 7 is a cross sectional view on an enlarged scale on the line 7—7 of Figure 2.
Figure 8 is an enlarged cross sectional view of a fragmentary portion of the machine on the line 8—8 of Figure 2.
Figure 9 is an enlarged cross sectional view of a fragmentary portion of the machine on the line 9—9 of Figure 2.
Figure 10 is an enlarged perspective view of an operative component of the cutter blade operating mechanism of the machine.

In this arrangement the sprocket 218 journaled on the reel shaft 97 has a cylindrical hub one end of which has a flat bearing surface and the other end of which is provided with an annular series of ratchet teeth 122. A collar 123 secured on the reel shaft 97 bears against the flat end of the sprocket hub and holds the sprocket hub against movement longitudinally of the reel shaft in the corresponding direction. A clutch element 124 is mounted on the reel shaft and is drivingly connected to the reel shaft by suitable means, such as the key 125 which permits the element 124 to move longitudinally of the reel shaft while providing a torque transmitting connection between the element and the shaft. The element 124 is provided on its end facing the sprocket hub with an annular series of ratchet teeth 126 which mesh with the teeth 122 on the sprocket hub. The teeth 122 and 126 are so inclined that the sprocket will drive the element 124 and the reel shaft 97 in one direction and the clutch element and reel shaft can overrun the sprocket in the same direction of rotation. A compression spring 127 surrounds the clutch element and bears at one end against an annular shoulder provided on the clutch element adjacent the sprocket hub and bears at its opposite end against an abutment washer 128 secured on the reel shaft 97 by a nut 129. The spring 127 resiliently urges the clutch element into driving engagement with the sprocket hub so that the reel shaft will be driven by the sprocket whenever the speed of rotation of the sprocket is as great as the speed of rotation of the reel shaft in the operative direction of rotation.

Since the axle shaft 48 and the pivotal connection between the rear end of the link 80 and the axle 10 have separate axes which are slightly spaced apart, raising and lowering the grain table and backboard assembly in the manner described above will change the tension on the chain 116. In order to maintain this chain at the proper tension a chain tightener is provided, as particularly illustrated in Figure 8. This chain tightener comprises a lever 130 pivotally mounted intermediate its length on the bracket 131 which projects rearwardly from the backboard 61 and in which the shaft 110 is journaled. An idler sprocket 132 is carried by this lever 130 at the upper end of the lever and bears on the upper flight of the chain 116. A tension spring 133 is connected between the lower end of the lever 130 and the lower edge of the backboard 61 to apply a resilient pressure on the sprocket 132 and maintain the chain 116 in a properly tensioned condition.

A shaft 135 is journaled on the back side of the backboard 61 at the bottom edge of the backboard and extends from the link 81 to the right-hand end of the grain table and backboard assembly, as viewed in Figure 2. Complementary sprockets 220 and 221 are secured on the inner end of this shaft and on the axle shaft 49 and a chain 136 trained around these sprockets drivingly connects the axle shaft 49 to the shaft 135.

A chain tightener, not shown, similar to that illustrated in Figure 8 and described in detail above is applied to the chain 136.

At its outer end the shaft 135 extends into a gear box 137 and the adjacent end of the shaft of the end roller 71 also extends into this gear box and the shaft is drivingly connected to the end roller by a beveled gear 138 secured on the outer end of the shaft 135 and a beveled gear 139 secured on the corresponding end of the shaft of the roller 71 and meshing with the gear 138. A stub shaft 140 is journaled on the rear side of the backboard above the outer end portion of the shaft 135 and complementary chain sprockets 222 and 223 on the shaft 135 and the stub shaft 140 are drivingly connected by a chain 141 so that the stub shaft 140 is driven by the shaft 135.

Complementary chain sprockets 224 and 225 are provided on the outer end of the stub shaft 140 and on the reel shaft 97 at the outer side of the reel supporting arm 95 and a chain 142 connects the sprockets on the stub shaft and on the reel shaft so that the reel shaft is driven from the stub shaft 140.

A one way driving unit, generally indicated at 143, and of the same construction as that illustrated in Figure 7 and described above, is connected between the sprocket journaled on the reel shaft and the reel shaft to provide a one way drive for the corresponding end of the reel shaft.

With this arrangement, when the machine is being driven straight ahead both conveyers 66 and 67 and both ends of the reel shaft 97 are driven at the same speed. However, when the machine is making a turn the conveyer at the inner side of the turn will be slowed down in proportion to the slowing down of the inner main wheel 13 or 14. The reel will continue to be driven at the same speed, however, since it will be driven from the outer main wheel by the driving connection at the end of the reel shaft at the outer side of the turn and the one way driving connection on the reel shaft at the inner side of the turn will permit the real shaft to overrun this driving connection.

In order to permit the machine to move from place to place without operating the reel and the conveyers, suitable manually operated clutches are provided in the above described conveyer and reel driving mechanism. These clutches are preferably interposed between the axle shafts 48 and 49 and the chain sprockets mounted on and driven by these axle shafts and one of the clutches is illustrated in detail in Figure 9. The clutch on the axle shaft 48 has been selected for detailed illustration and, as illustrated in Figure 9, the chain sprocket 114 is journaled on the axle shaft 48 and is provided with a generally cylindrical hub one end of which provides a flat bearing surface and the other end of which is provided with an annular series of clutch teeth 145. This sprocket is held against movement longitudinally of the axle shaft by an abutment collar 146 secured on the shaft and bearing against the flat end of the sprocket. A clutch element 147 is slidably mounted on the shaft 48 at the side of the sprocket hub provided with the clutch teeth 145 and has on its end adjacent the sprocket hub, clutch teeth 148 which engage with the clutch teeth 145 on the sprocket 114 to provide a driving connection between the clutch element and the sprocket. A driving connection is provided between the axle shaft 48 and the clutch element 147 by suitable means such as the key 149 which permits sliding movement of the clutch element toward and away from the sprocket hub. The clutch element is resiliently urged toward the sprocket hub to engage the teeth 148 with the teeth 145 by a compression spring 150 which surrounds a portion of the clutch element and bears at one end against an annular shoulder on the clutch element and at its opposite end against a spring abutment collar 151 secured on the axle shaft. The clutch element is provided with an annular groove 152 and a fork 153 surrounds the grooved portion of the clutch element and is provided with pins which engage in the groove. This forked element is pivotally mounted intermediate its length on the front end of the frame side member 15, and is connected at its end remote from the clutch element to a manually rotatable crank 154 by a link 155. A similar clutch, not shown, is provided between the axle shaft 49 and the gear thereon and the forked lever of this clutch is connected by a link 156 to the end of the crank 154 opposite that to which the link 155 is connected. The crank is positioned adjacent the steering wheel 29 in convenient reach of the operator so that the drive for the reel and the conveyers can be manually engaged and disengaged as may be desired.

A guard bar carrying guards 157 is mounted on the bar 63 at the front edge of the grain table frame 62 and a cutter blade 158 is reciprocable in the guards.

Suitable means are provided for reciprocating the blade in the series of guards by means of power derived from the engine 32. This means comprises a shaft 160 journaled at the front end of the engine frame and projecting forwardly therefrom. This shaft is driven from the engine drive shaft 37 by a suitable gear or chain and sprocket drive 161. A gear box 162 is mounted on the rear side of the backboard 61 and a shaft 163 connected at its rear end to the front end of the shaft 160 by a universal joint 164 extends into the gear box 162 and has a beveled gear 165 secured on its end within the gear box. Actually, in order to provide for movement of the gear box with the assembly 60 during the raising and lowering movements of the latter, the gear 165 is mounted on a stub shaft 166 which projects out of the gear box and is connected to the shaft 163 by a second universal joint 167. The shaft 163 is also made extensible in length to accommodate for this movement of the gear box relative to the shaft 160.

A jack shaft 168 is journaled in brackets 169 and 170 which project rearwardly from the rear side of the backboard 61 and this shaft extends at one end into the gear box 162 and has a beveled gear 171 secured thereon which meshes with the gear 165 to drive the jack shaft 168 from the shafts 160 and 163.

Two spaced apart, substantially parallel discs 172 and 173 are secured on the jack shaft 168 and are skewed at an angle to the axis of rotation of the jack shaft to provide a cam action when the jack shaft rotates.

A support bar 174 extends transversely across the grain table frame and between the upper and lower flights of the conveyer belt 70. A swing lever 175 is pivotally connected intermediate its length to the bar 174 by a pivot pin 176 and is connected at its front or outer end of the cutter blade 158 by a pivotal connection 177. A ball 178 is mounted on the opposite or rear end of the swing bar 175 and is disposed between the two discs 172 and 173 so that this lever will be swung or oscillated when the discs are rotated by the shaft 168 to reciprocate the cutter blade in the cutter bar guards.

If desired, suitable clutch means, not shown, may be provided between the shaft 37 and the shaft 160 for manually discontinuing and resuming operation of the cutter blade as desired.

The construction of the cam disc and ball arrangement is illustrated in detail in Figure 10.

In order to counterbalance the weight of the grain table and backboard assembly an elongated beam 180 is secured to one side of the motor frame 30 and extends rearwardly of the main frame and suitable weights 181 are mounted on this beam at the rear end of the latter.

The mounting of the table, conveyer, backboard and reel assembly on the machine by the pivotal links 80 and 81 is such that this assembly can be easily removed and a sweep rake of conventional or known construction attached to the machine frame in place of the assembly for bucking up straw or hay.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A windrowing harvester comprising a horizontally disposed main frame, a pair of main drive wheels arranged in parallel spaced relation positioned adjacent to and supporting the forward end of said frame, a steerable wheel assembly supporting the rear end of said frame, said wheel assembly being disposed between said main drive wheels and nearer to one of said wheels than to the other of said wheels and thereby forms a space between said wheel assembly and the other of said drive wheels of sufficient size for the passage of the cut grain therethrough without being disturbed, a horizontally disposed table arranged transversely of and below said frame and forwardly of said drive wheels and connected to said frame, said table being of a length such that slightly more than one half lies on the side of the other of said drive wheels adjacent said one of said drive wheels with the remainder lying beyond the side of the other of said drive wheels remote from said one of said drive wheels, an upstanding backboard extending along the side edge of said table adjacent said frame, cutting means along the side edge of said table remote from said frame, a pair of endless conveyers arranged in confronting end to end spaced relation superimposed longitudinally of and upon said table forwardly of said backboard and each mounted for rotation about horizontal axes, the spacing between the confronting ends of said conveyers being located between said steerable wheel assembly and said other of said main wheels, said backboard being provided in the portion intermediate said wheel assembly and said other of said main wheels with an opening, said opening being in registry with the spacing between the confronting ends of said conveyers and the space between said wheel assembly and the other of said drive wheels, and a horizontally disposed reel positioned longitudinally of and above said table and forwardly of said backboard and supported on said backboard for rotation about a horizontal axis.

2. A windrowing harvester comprising a horizontally disposed main frame, a pair of main drive wheels arranged in parallel spaced relation positioned adjacent to and supporting the forward end of said frame, a steerable wheel assembly supporting the rear end of said frame, said wheel assembly being disposed between said main drive wheels and nearer to one of said wheels than to the other of said wheels and thereby forms a space between said wheel assembly and the other of said drive wheels of sufficient size for the passage of the cut grain therethrough without being disturbed, a horizontally disposed table arranged transversely of and below said frame and forwardly of said drive wheels and connected to said frame for raising and lowering movement, said table being of a length such that slightly more than one half lies on the side of the other of said drive wheels adjacent said one of said drive wheels with the remainder lying beyond the side of the other of said drive wheels remote from said one of said drive wheels, an upstanding backboard extending along the side edge of said table adjacent said frame, cutting means along the side edge of said table remote from said frame, a pair of endless conveyers arranged in confronting end to end spaced relation superimposed longitudinally of and upon said table forwardly of said backboard and each mounted for rotation about horizontal axes, the spacing between the confronting ends of said conveyers being located between said steerable wheel assembly and said other of said main wheels, said backboard being provided in the portion intermediate said wheel assembly and said other of said main wheels with an opening, said opening being in registry with the spacing between the confronting ends of said conveyers and the space between said wheel assembly and the other of said drive wheels, a horizontally disposed reel positioned longitudinally of and above said table and forwardly of said backboard and supported on said backboard for rotation about a horizontal axis, and means operatively connected to said table for effecting the raising and lowering movement of the latter.

3. A windrowing harvester comprising a horizontally disposed main frame, a pair of main drive wheels arranged in parallel spaced relation positioned adjacent to and supporting the forward end of said frame, a steerable wheel assembly supporting the rear end of said frame, said wheel assembly being disposed between said main drive wheels and nearer to one of said wheels than to the other of said wheels and thereby forms a space between said wheel assembly and the other of said drive wheels of sufficient size for the passage of the cut grain therethrough without being disturbed, a horizontally disposed table arranged transversely of and below said frame and forwardly of said drive wheels and connected to said frame for raising and lowering movement, said table being of a length such that slightly more than one half lies on the side of the other of said drive wheels adjacent said one of said drive wheels with the remainder lying beyond the side of the other of said drive wheels remote from said one of said drive wheels, an upstanding backboard extending along the side edge of said table adjacent said frame, cutting means along the side edge of said table remote from said frame, a pair of endless conveyers arranged in confronting end to end spaced relation superimposed longitudinally of and upon said table forwardly of said backboard and each mounted for rotation about horizontal axes, the spacing between the confronting ends of said conveyers being located between said steerable wheel assembly and said other of said main wheels, said backboard being provided in the portion intermediate said wheel assembly and said other of said main wheels with an opening, said opening being in registry with the spacing between the confronting ends of said conveyers and the space between said wheel assembly and the other of said drive wheels, a horizontally disposed reel positioned longitudinally of and above said table and forwardly of said backboard and supported on said backboard for rotation about a horizontal axis, adjustable means operatively connected to said reel for varying the position of said reel relative to said table, and means operatively connected to said table for effecting the raising and lowering movement of the latter.

References Cited in the file of this patent

UNITED STATES PATENTS

| Number | Name | Date |
|---|---|---|
| 885,157 | Hovland | Apr. 21, 1908 |
| 1,792,691 | Harris et al. | Feb. 17, 1931 |
| 2,510,245 | Munter | June 6, 1950 |
| 2,524,083 | Ronning | Oct. 3, 1950 |